(12) United States Patent
Lee et al.

(10) Patent No.: US 9,965,114 B2
(45) Date of Patent: May 8, 2018

(54) METHOD FOR POSITION DETECTION AND SENSING DEVICE APPLYING THE SAME METHOD

(71) Applicants: SALT INTERNATIONAL CORP., New Taipei (TW); IMAGINATION BROADWAY LTD., New Taipei (TW)

(72) Inventors: Shang-Li Lee, New Taipei (TW); Zong-Bin Liao, New Taipei (TW)

(73) Assignees: SALT INTERNATIONAL CORP., New Taipei (TW); IMAGINATION BROADWAY LTD., New Taipei (TW)

( * ) Notice: Subject to any disclaimer, the term of this patent is extended or adjusted under 35 U.S.C. 154(b) by 63 days.

(21) Appl. No.: 14/747,270

(22) Filed: Jun. 23, 2015

(65) Prior Publication Data
US 2016/0170526 A1    Jun. 16, 2016

(30) Foreign Application Priority Data

Dec. 15, 2014   (TW) .............................. 103143747 A

(51) Int. Cl.
G06F 3/045      (2006.01)
G06F 3/044      (2006.01)
G06F 3/041      (2006.01)

(52) U.S. Cl.
CPC ............ G06F 3/044 (2013.01); G06F 3/0416 (2013.01)

(58) Field of Classification Search
CPC .................. G06F 3/044; G06F 3/0416; G06F 2203/04104
USPC ......................................................... 345/174
See application file for complete search history.

(56) References Cited

U.S. PATENT DOCUMENTS

| 2004/0090432 A1* | 5/2004 | Takahashi ............. G06F 3/0436 345/173 |
| 2009/0085891 A1* | 4/2009 | Yang ....................... G06F 3/044 345/174 |
| 2012/0287054 A1* | 11/2012 | Kuo ........................ G06F 3/044 345/173 |
| 2013/0016051 A1* | 1/2013 | Yeh ......................... G06F 3/044 345/173 |
| 2013/0021293 A1* | 1/2013 | Nakai .................... G06F 1/1626 345/174 |
| 2013/0057507 A1* | 3/2013 | Shin ........................ G06F 3/044 345/174 |

(Continued)

FOREIGN PATENT DOCUMENTS

| TW | 201042514 | 12/2010 |
| TW | 201137713 | 11/2011 |

(Continued)

Primary Examiner — Yuzhen Shen
(74) Attorney, Agent, or Firm — Hauptman Ham, LLP

(57) ABSTRACT

A method for position detection is adapted to a sensing device. The sensing device includes a plurality of sensing blocks arranged in a 2D array, with each block having a plurality of sensing points arranged in a 2D array. The method includes conducting a block-scan to determine if a touched block exists, and conducting a point-scan to obtain a touched point if the touched block exists. In order to obtain a touched point, the sensing device applying the method conducts a block-scan within the sensing area and then a point-scan within the touched block instead of point-scanning the whole sensing area. Accordingly, the sensing device could obtain the touched point faster than before.

16 Claims, 12 Drawing Sheets

(56) References Cited

U.S. PATENT DOCUMENTS

| | | | | |
|---|---|---|---|---|
| 2013/0106711 A1* | 5/2013 | Hou | ............ | G06F 3/044 |
| | | | | 345/173 |
| 2013/0278535 A1* | 10/2013 | Kim | ............ | G06F 3/0416 |
| | | | | 345/173 |
| 2013/0321290 A1* | 12/2013 | Oh | ............ | G06F 3/0416 |
| | | | | 345/173 |
| 2014/0240246 A1 | 8/2014 | Kim | | |
| 2015/0077370 A1* | 3/2015 | Kim | ............ | G06F 3/0416 |
| | | | | 345/173 |
| 2015/0116256 A1* | 4/2015 | Hsu | ............ | G06F 3/0416 |
| | | | | 345/174 |

FOREIGN PATENT DOCUMENTS

| | | |
|---|---|---|
| TW | 201201067 | 1/2012 |
| TW | 201317876 | 5/2013 |
| TW | 201344544 | 11/2013 |
| TW | 201441880 | 11/2014 |

\* cited by examiner

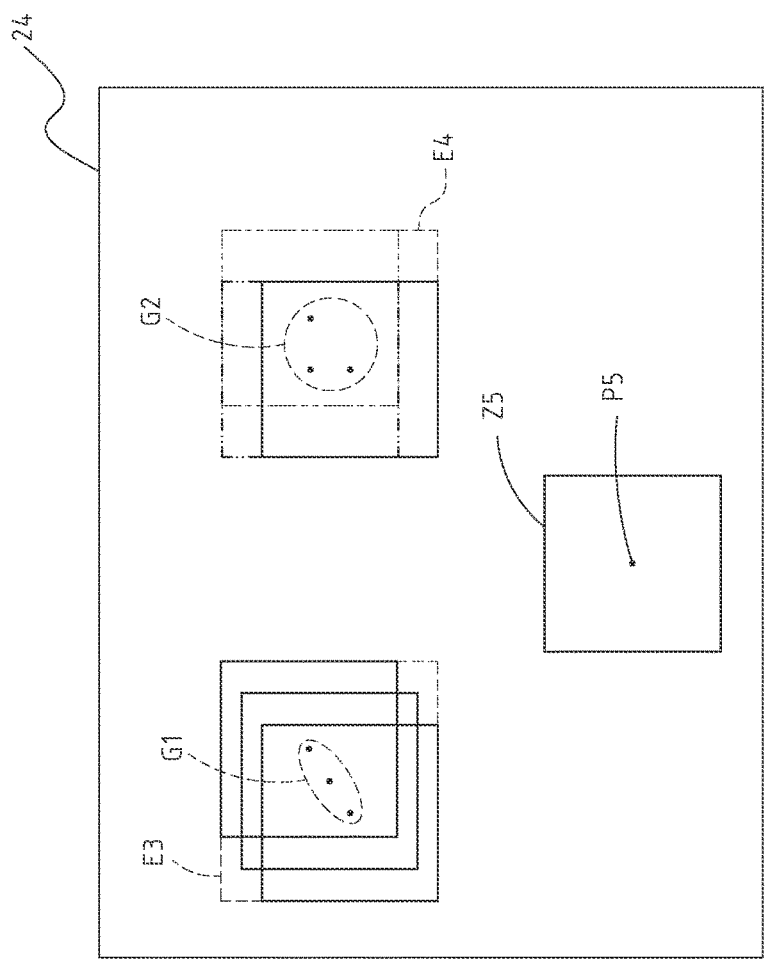

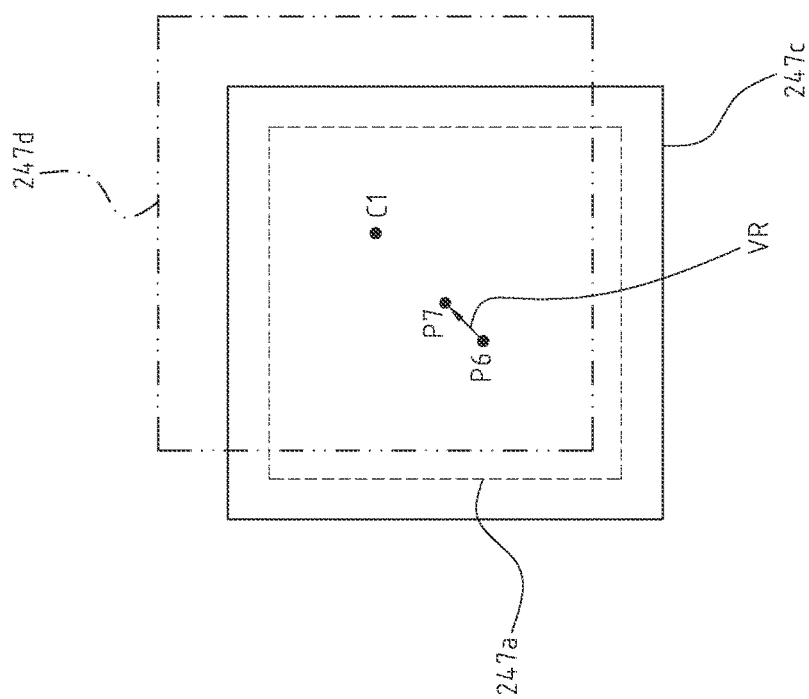

METHOD FOR POSITION DETECTION AND SENSING DEVICE APPLYING THE SAME METHOD

CROSS-REFERENCES TO RELATED APPLICATIONS

This non-provisional application claims priority under 35 U.S.C. § 119(a) on Patent Application No. 103143747 filed in Taiwan, R.O.C. on 2014 Dec. 15, the entire contents of which are hereby incorporated by reference.

BACKGROUND

Technical Field

The instant disclosure relates to a position detection method and a sensing device using the same, in particular, to a method for enhancing detection speed and a sensing device using the same.

Related Art

In the history of touch screen technology, the advancement of single point touch sensing to multi-point touch sensing and touch point tracking have always been the focuses of technological breakthroughs.

In recent periods, most of the touch screens for multi-point touch sensing and tracking of multiple touch points utilize capacitive touch sensing system. This type of system relies on self-capacitance and/or mutual capacitance sensing methods to determine if the touch screen has being touched by the user. During the sensing period, when the controller of the sensing system has detected a change in capacitance for a particular location, the location is deemed to have been touched by the user. Therefore, when the sensing system is in operation, in addition to detecting the capacitance of each coordinate position, it will also compare the detected values with a non-contact capacitance value. If any of the differences after comparison is greater than a predetermined threshold value, that particular coordinate position is determined to have been touched by the user.

SUMMARY

Based on the above description, to determine if the touch screen has been touched, the sensing system must first obtain the capacitance value of the coordinate position of the touch screen. Then, each of the obtained values must be compared with the threshold value before the results can be analyzed, and each of these steps takes up a certain amount of time. With that in mind, along with the demanded features of multi-touch sensing and touch tracking (drawing) for improved touch screens, fast response time by the sensing system when a touch event has occurred is continuously strived for by commercial manufacturers.

In view of the foregoing, the instant disclosure provides a position detection method and a sensing device using the same, such that the time needed to detect the touched (input) point or points can be shortened. The sensing device comprises a plurality of "sensing blocks" arranged in a two dimensional (2-D) array, with each block having a plurality of sensing points arranged in a 2-D array.

According to one embodiment, the position detection method includes the steps of: conducting a block-scan to determine if a sensing block has been touched; and conducting a point-scan to obtain a touched point within the touched block.

In one embodiment, the block-scanning operation is subdivided into an activation phase and a detection phase. When a sensing block is activated, all of its sensing points are activated simultaneously. Likewise, during the detection phase, all of its sensing points are detected simultaneously to obtain a block capacitance. When this capacitance value is greater than a first threshold value, the detected block is determined to be a touched block.

In one embodiment, after the touched block has been determined, its sensing points are scanned to obtain the touched point. The point-scanning operation includes the steps of: activating and detecting each of the sensing points in sequence to obtain its respective point capacitance; designating the sensing point as the touched point (first touched point) if the corresponding point capacitance is greater than a second threshold value.

In one embodiment, after the touched point (first touched point) has been obtained, the method continues with the steps of: obtaining a first area based on the touched point, with the first area having a plurality of sensing points and the touched point; and obtaining another touched point (second touched point) by activating and detecting the sensing points within the first area.

In one embodiment, after the second touched point has been obtained, the method continues with the steps of: obtaining a position vector based on the first and second touched points; obtaining a second area based on the second touched point and the position vector, with the second area having a plurality of sensing points and the second touched point, which deviates from the center of the second area toward a direction opposite of the position vector by a distance directly proportional to the magnitude of the position vector; and activating and detecting the sensing points within the second area.

In one embodiment, the size of the second area is directly proportional to the magnitude of the position vector. The first threshold value is obtained by adding a block background signal value to a block differential capacitance. The second threshold value is obtained by adding a point background signal value to a point differential capacitance.

In one embodiment, after the second touched point has been obtained, the method continues with the following steps: obtaining a position vector based on the first and second touched points; obtaining a second area based on the second touched point and position vector, with the second area having a plurality of sensing points and the second touched point, which is located at the center of the second area, and the size of the second area is directly proportional to the magnitude of the position vector; and activating and detecting the sensing points within the second area.

In one embodiment, the sensing device of the instant disclosure comprises: a first sensing layer and a second sensing layer arranged in a stacked configuration to define a sensing area, which is defined with a plurality of sensing blocks arranged in a 2-D array, and each of the sensing blocks is disposed with a plurality of sensing points arranged in a 2-D array; and a controller for scanning a sensing block to determine if it has been touched and to obtain at least one touched point by scanning the sensing points within a touched block.

In one embodiment, the controller includes: a plurality of activators with each of the activators corresponding to at least one sensing block for activating its sensing points; a plurality of detectors with each of the detectors corresponding to at least one sensing block, such that the capacitance of each activated sensing point may be detected; and a processor for activating the activators and detectors to scan the sensing blocks. The processor performs by: activating and detecting the sensing blocks in sequence in a manner that for each sensing block, all of its sensing points are activated simultaneously, followed by simultaneous detection thereof to obtain a block capacitance; and designating the detected sensing block as the touched block when the corresponding block capacitance value is greater than a first threshold value.

After the touched block has been determined, the processor scans the sensing points within the touched block to obtain at least one touched point. The point-scanning operation includes the following steps: activating and detecting the sensing points within the touched block to obtain respective point capacitances; and designating the sensing point as the touched point when the corresponding point capacitance is greater than a second threshold value.

BRIEF DESCRIPTION OF THE DRAWINGS

FIG. 8 is a schematic view for an extended area and an expanded area of the first touched point group for a first embodiment of the instant disclosure;

FIG. 11 shows another position vector and another second area defined for the third embodiment of the position detection method of the instant disclosure.

DETAILED DESCRIPTION

To begin with, it should be understood that a position detection method of the instant disclosure is adaptable to a sensing device capable of receiving position (sensing point) information. The sensing device may be, but not limited to, touch screen, digital drawing board, and digital writing board. The embodiments provided hereinafter are in reference to a touch sensing device for explanatory purpose, but the scope of the instant disclosure is not limited thereto. For example, when the provided embodiments mention touch sensing, if the sensing device is a touch screen, then touch sensing is achieved by a user's hand or a stylus. In the case of a digital drawing board, touch sensing is performed by a touch element, such as a touch pen. If the sensing device is a digital writing board, touch sensing would be accomplished via an input device, such as the hand of a user or the touch pen.

The position detection method of the instant disclosure is applicable to touch events generated by hand, stylus, or some other input device. For the embodiments provided hereinafter and appended claims, terms such as "touch", "touched", and "touched point" are used, which are meant for "input", "inputted", and "input point", respectively, and applicable to above mentioned sensing devices. It should be understood that the use of the terms "touch", "touched", and "touched point" do not limit the scope of the instant disclosure.

In the following descriptions, a semi-transparent sensing device 10 is used for exemplary purpose, but the instant disclosure is not limited thereto. For example, if the position detection method is applied to digital drawing or writing boards, the sensing device 10 may be non-transparent.

Figure 1:
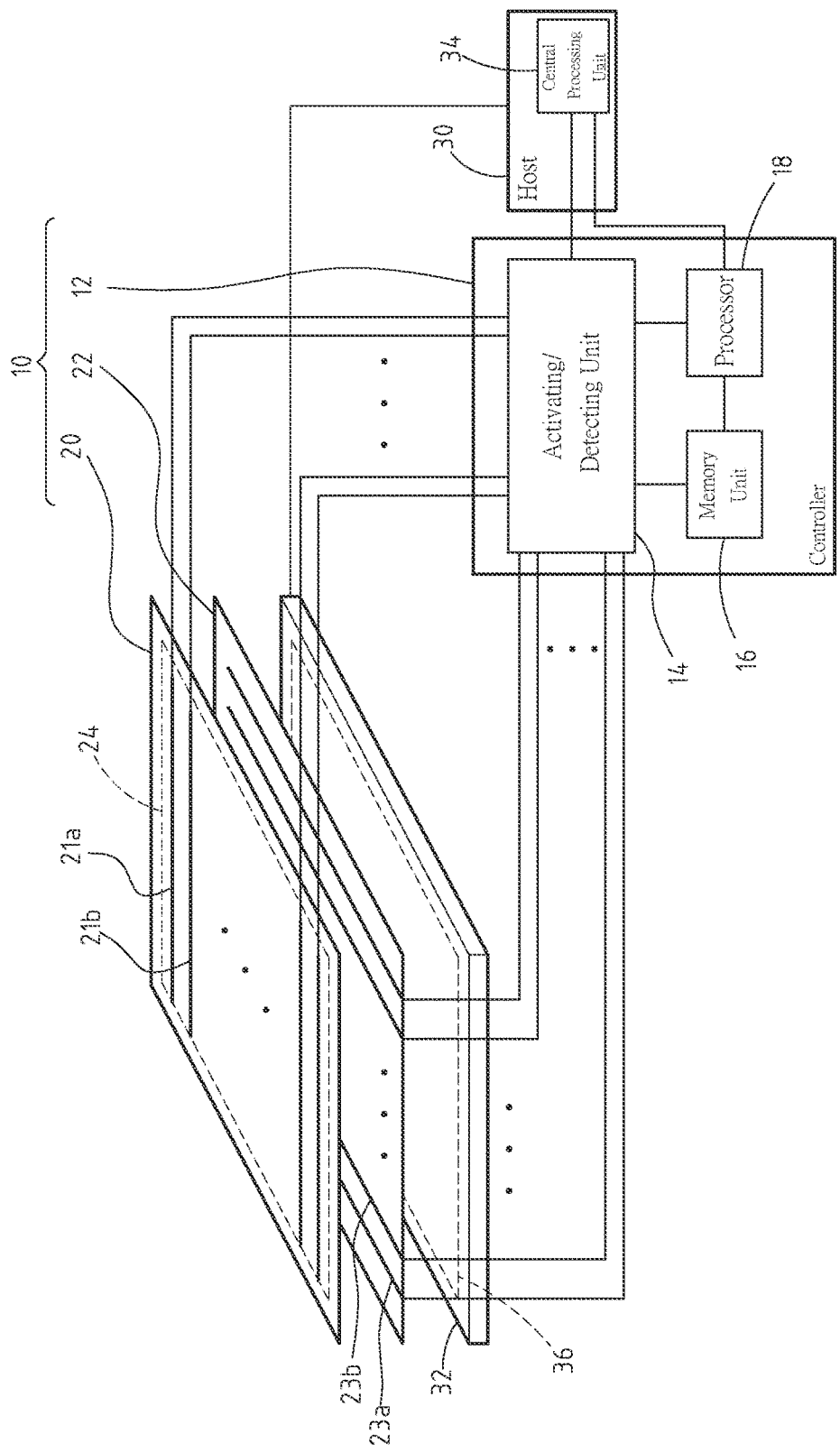
FIG. 1 shows a circuit block diagram for a touch screen of a sensing device of the instant disclosure.

Please refer to FIG. 1, which shows a circuit block diagram for the sensing device 10 of a touch screen of the instant disclosure. As can be seen, the touch screen comprises the sensing device 10 (also called touch device herein), a host 30, and a display 32. The sensing device 10 includes a controller 12 (also called a touch controller herein), a first sensing layer 20, and a second sensing layer 22.

The first sensing layer 20 is stacked over the second sensing layer 22. An insulating layer (not shown) may be sandwiched between the first and second sensing layers 20 and 22. For the instant embodiment, the first sensing layer 20 includes a plurality of first electrically conductive elements, such as 21a and 21b, arranged parallelly. Similarly, the second sensing layer 22 includes a plurality of second electrically conductive elements, such as 23a and 23b, arranged parallelly. As can be seen form a top view, the first electrically conductive elements 21a and 21b and second electrically conductive elements 23a and 23b define a plane coordinate system. For the instant embodiment, a Cartesian coordinate system is provided but is not limited thereto. Alternatively, an absolute coordinate system, non-right-angled coordinate system, or some other plane coordinate system may also be used.

The conductive elements 21a, 21b, 23a, and 23b mentioned above have bar-type geometry, but are not restricted thereto. Meanwhile, the overlapping of the conductive elements 21a and 21b with 23a and 23b can form a diamond shaped pattern, if seen from a top view. Optionally, the conductive elements 21a, 21b, 23a, and 23b may be arranged coplanarly on a single sensing layer.

The display 32 is disposed underneath the second sensing layer 22. With the first and second sensing layers 20 and 22 being transparent or semi-transparent, when the display 32 is showing visual information, the user may see through the first and second sensing layers 20 and 22 to view the content shown by the display 32. That is to say the light emitted from the display 32 can be projected through the first and second sensing layers 20 and 22 in reaching the eyes of a viewer.

When the touch screen is in operation, the host 30 utilizes the display 32 to present the content intended for the user. When the user makes a touch to the sensing device 10, the touched (inputted) coordinates are transmitted by the sensing device 10 back to the host 30, for further processing by a central processing unit (CPU) 34 embedded in the host 30. The processing is dependent of the software application that corresponds to the display position identified by the touched coordinates on the display 32. For example, the CPU 34 may initialize a particular software application, display a mark of touch pen, etc. The area of the display 32 for showing the content is typically referred to as an active area (AA) 36, which corresponds to the sensing area 24 jointly defined by the first and second sensing layers 20 and 22. The sensing area 24 is capable of detecting whether the user has made a touch to the sensing device 10.

Next, the controller 12 includes an activating/detecting unit 14, a memory unit 16, and a processor 18. The activating/detecting unit 14 includes an activating element 140 and a detecting element 145, both of which can be integrated into a single element or kept separate depending on design preference.

To detect a user's touch, the controller 12 may utilize self-capacitance or mutual capacitance method. For the self-capacitance method, the processor 18 controls the activating/detecting unit 14 to activate the first electrically conductive elements, 21a and 21b and then detects the same. Same operations may be applied to the second electrically conductive elements 23a and 23b. More specifically, the activating/detecting unit 14 may activate one of the first electrically conductive elements, like 21a, and then detects the self-capacitance of this conductive element. In particular, self-capacitance may be estimated by measuring the time-to-charge-to-set-voltage (TCSV) or the voltage-after-charging-for-a-set-time (VACST). It should be understood that the measurement of self-capacitance is referring to: the act of activating and detecting one of the first electrically conductive elements, such as 21a or 21b, or one of the second electrically conductive elements, such as 23a or 23b, in a given time period by the activating/detecting unit 14. Thus, when a change in capacitance is detected, the detection is indicating the capacitance value for one of the first electrically conductive elements, such as 21a or 21b, or one of the second electrically conductive elements, such as 23a or 23b, has changed. This change in capacitance of a single electrically conductive element is only suggesting that a particular horizontal or vertical position has been touched, rather than a coordinate pair of a specific point.

On the other hand, for measuring mutual capacitance, one of the first electrically conductive elements, such as 21a, and one of the second electrically conductive elements, such as 23a, are selected by the activating/detecting unit 14 for activation and detection. In this manner, the measured mutual capacitance is of the intersecting point defined by the selected first and second electrically conductive elements 21a and 23a. Thus, the detected mutual capacitance corresponds to a specific point within the coordinate system. That is to say if a mutual capacitance value has changed, it can be said that a specific point within the coordinate system has been touched. This measurement method normally, but is not limited thereto, first measures the mutual capacitance at the intersection points between one particular first electrically conductive element, such as 21a, and each of the second electrically conductive elements, like 23a and 23b, in sequence. Like measurements are performed for another first electrically conductive element, such as 21b, in an identical fashion until all of the intersection points within the coordinate system have been measured. The above procedures belong to activating and detecting the touch screen in a single pass. When in use, the activating and detecting operations are to be repeated continuously. The following descriptions are all based on the mutual capacitance method. However, the scope of the instant disclosure is not restricted to this method.

Notably, the activation and detection of the conductive elements may be carried out by way of number counting. That is, the first conductive elements can be individually indexed 1, 2, 3, 4, and so forth, starting from one side of the sensing device 10 and progressing toward the opposite side thereof. Based on the assigned index value, the conductive elements for activation/detection can be count by ones, such as 1, 2, 3, and so forth. Another approach is to count by twos such as 1, 3, 5, and so forth. In such scenario, after the odd-indexed conductive elements have been activated and detected, the even-indexed conductive elements such as 2, 4, 6, and so forth can undergo activation and detection, until all of the conductive elements within a sensing layer have been activated and detected in a single pass.

For the above-described activating/detecting operation, only one conductive element is activated and then detected at a time. However, in practice, the activating/detecting operation is not restricted thereto. For example, in a single pass, all or some of the electrically conductive elements (first and second electrically conductive elements) may be activated simultaneously. The activation is followed by simultaneous detection of activated conductive elements. In the case of activating the first electrically conductive elements, such as 21a and 21b, the odd indexed electrically conductive elements, as represented by 21a, can first be activated and detected. Then, the even indexed electrically conductive elements, as represented by 21b, can be activated and detected. The utilization of simultaneous activation of conductive elements followed by simultaneous detection of activated conductive elements reduces the time of activating/detecting operations in a single pass significantly.

Figure 2:
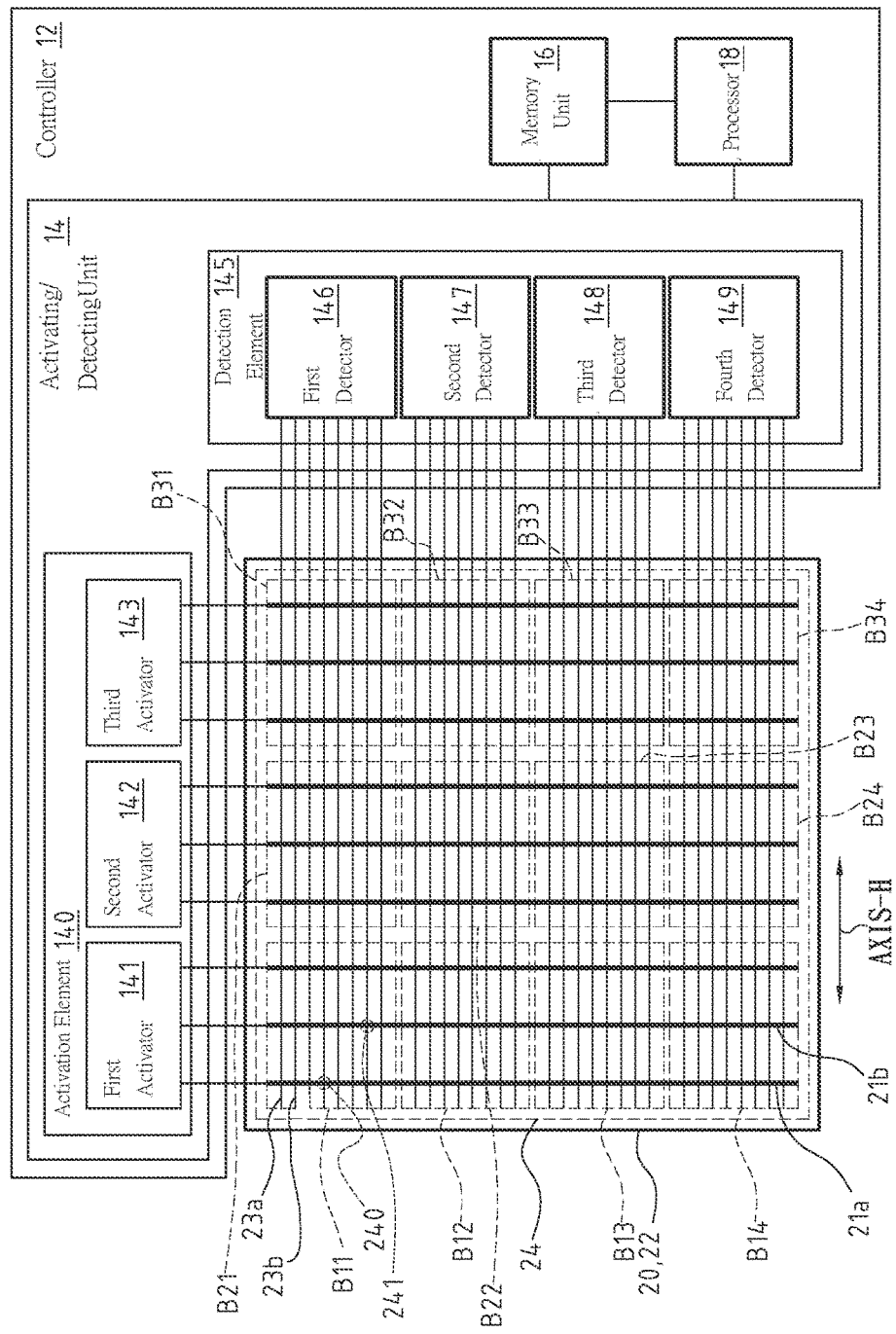
FIG. 2 shows a circuit block diagram of the sensing device of the instant disclosure.

Please refer to FIG. 2, which shows a block diagram of a circuit within the sensing device 10. For explanatory purpose, the figure shows nine first electrically conductive elements and 32 second electrically conductive elements. However, the instant disclosure is not restricted thereto.

As can be seen from FIG. 2, the controller 12 comprises the activating/detecting unit 14, the memory unit 16, and the processor 18. The activating/detecting unit 14 includes the activation and detection elements 140 and 145. The activation element 140 may include a first activator 141, a second activator 142, and a third activator 143. The detection element 145 may include a first detector 146, a second detector 147, a third detector 148, and a fourth detector 149. The activation and detection elements 140 and 145 may be grouped into a single integrated circuit (IC) or kept as two separate integrated circuits. Another approach is to integrate the first activator 141 and the first detector 146 into a single integrated circuit, the second activator 142 and the second detector 147 into another integrated circuit, and so forth. Although for the description provided hereinbelow is based on keeping the activation element 140 and detection element 145 as separate elements, but the instant disclosure is not restricted thereto.

As shown in FIG. 2, each of the activators 141, 142, and 143 corresponds to three first electrically conductive elements, as represented by 21a and 21b. Each of the detectors 146, 147, 148, and 149 corresponds to eight second electrically conductive elements, as represented by 23a and 23b. However, the instant disclosure is not restricted to the above configuration. In particular, each of the intersecting locations between the first and second electrically conductive elements is recognized as a sensing point, such as 240 and 241 (detection of mutual capacitance). A closer look of the figure shows all of the sensing points, like 240 and 241, are grouped into 12 sensing blocks denoted by B11, B21, B31, B12, B22, B32, B13, B23, B33, B14, B24, and B34. The groups are arranged in a 2-D array, and the grouping is based on the positional relationship between the sensing points and the activators and the detectors. Within each of the sensing blocks, a total of 24 sensing points are arranged in a 2-D as well. For the instant embodiment, each of the activators 141, 142 and 143 corresponds to four sensing blocks. As an example, the first activator 141 corresponds to the sensing blocks B11, B12, B13, and B14. Meanwhile, each of the detectors 146, 147, 148, and 149 corresponds to three sensing blocks. An example may be the first detector 146 corresponding to the sensing blocks B11, B21, and B31. Although the relationship of correspondence is described as above, the instant disclosure is not restricted thereto. An alternative configuration is for each activator 141, 142, and 143 corresponding to one sensing block only, and the same can be applied to the detectors 146, 147, 148, and 149.

Each of the activators 141, 142, and 143 is to activate the sensing points within the corresponding sensing blocks. The sensing points may be activated either simultaneously or successively. Both activation methods are utilized for the instant disclosure. Using the first activator 141 as an example, for simultaneous activation, the first activator 141 is put under the control of the processor 18 (or CPU 34), and all of the sensing points disposed within the corresponding sensing blocks B11, B12, B13, and B14 are activated simultaneously. The activation is achieved by the activator 141, which supplies voltage signals to and electrically charges all of the sensing points within the sensing blocks B11, B12, B13, and B14. On the other hand, for the successive activation method, the first activator 141 begins by activating the first electrically conductive element 21*a* arranged across the sensing blocks B11, B12, B13, and B14. After the first electrically conductive element 21*a* has been activated, the first activator 141 proceeds to activate the next first electrically conductive element in sequence, such as 21*b*.

Once the corresponding sensing blocks have been activated, the detectors 146, 147, 148, and 149 are to detect the capacitances of all of the sensing points within these sensing blocks. Likewise, the sensing points may be detected either simultaneously or successively. Using the first detector 146 as an example, for simultaneous detection, the first detector 146 is put under the control of the processor 18 (or CPU 34), and the capacitances of all of the sensing points within the sensing block B11 (assuming activated) are detected simultaneously. The detected capacitances may be viewed as the block capacitance of the sensing block. On the other hand, for successive detection, the first detector 146 is again under the control of the processor (or CPU 34), and the capacitance of each second electrically conductive element, such as 23*a* and 23*b*, is detected successively. The detected capacitances are of respective sensing points. The detector may further convert the capacitances of all the sensing points within the same sensing block into the block capacitance, by any of the appropriate conversion relationships, empirical values, or tables, etc.

It should be understood that "scanning of the sensing block" may be defined by the following scenarios, but not limited to: 1) simultaneous activation of the sensing points followed by simultaneous detection of the same; and 2) simultaneous activation of the sensing points followed by successive detection of the same. That is to say, when a specific sensing block is activated, all of its sensing points are activated simultaneously. These sensing points are then detected simultaneously or successively to obtain the block capacitance. As an example, for simultaneous activation and simultaneous detection of activated sensing points, the sensing blocks B11, B12, B13, and B14 may be activated simultaneously. Then, all of the activated sensing points within the sensing block B11 are detected simultaneously. Thus, the block capacitance of all the sensing points, such as 240 and 241, for the sensing block B11 can be obtained. Next, proceeding in the column direction of the array, all of the activated sensing points within the sensing block B12 are detected simultaneously, in order to obtain its block capacitance. The same procedures may be repeated for other sensing blocks in a top-to-bottom direction for each column within the 2-D array.

Besides the above detection sequence, an alternate approach may be proceeding in a left-to-right direction for each row within the 2-D array, that is: B11, B21, B31, B12, B22, B32, B13, B23, B33, B14, B24, and B34. Still yet, another option is to activate and detect each sensing block randomly. Therefore, the concept of "simultaneous" is referring to activating all of the sensing points within a given sensing block at the same time, followed by detecting all of the activated sensing points at the same time. For simultaneous activation, a charge pump may be employed to ensure the activators 141, 142, and 143 have enough energy to perform its function.

Figure 3:
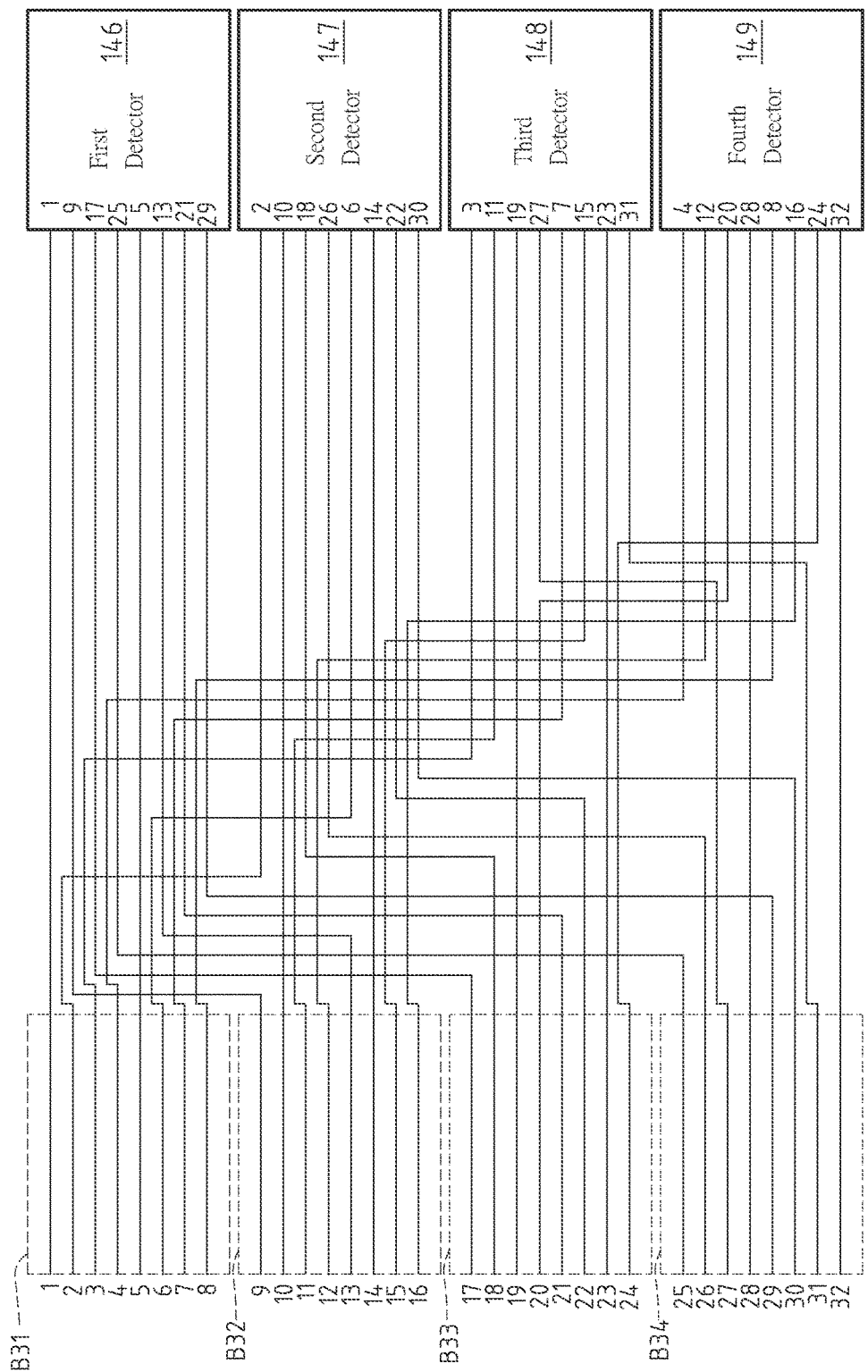
FIG. 3 shows a partial circuit block diagram of another embodiment for the sensing device of the instant disclosure.

Another topic for simultaneous detection is to avoid generating parasitic capacitance between conductive elements in close proximity, such as between the second electrically conductive elements 23*a* and 23*b* along the axis-H. Parasitic capacitance could adversely affect the accuracy of detected capacitances. To minimize this adverse effect, the closely spaced conductive elements 23*a* and 23*b* may be detected by different detectors, such as 146 and 147. For example, the capacitance of the conductive element 23*a* may be detected by the first detector 146, and the capacitance of the conductive element 23*b* may be detected by the second detector 147. More specifically, as best illustrated in FIG. 3, the second electrically conductive elements may be indexed from 1-32 in a top-to-bottom direction. In other words, for even distribution, the conductive elements indexed 1-8, 9-16, 17-24, and 25-32 correspond to the sensing blocks B31, B32, B33, and B34, respectively. For detection and to mitigate the effect of parasitic capacitance, one applicable arrangement (not shown) would be as follows: the first half of the odd indexed conductive elements (i.e., 1, 3, 5 . . . 15) are detected by the first detector 146; the first half of the even indexed conductive elements (i.e., 2, 4, 6, . . . 16) are detected by the second detector 147; the second half of the odd indexed conductive elements (i.e., 17, 19, 21 . . . 31) are detected by the third detector 148; and the second half of the even indexed conductive elements (i.e., 18, 20, 22, . . . 32) are detected by the fourth detector 149. As shown in FIG. 3, another option is to count the number by fours, such that the conductive elements indexed 1, 5, 9, 13 . . . are detected by the first detector 146, and so forth for other detectors. For measuring the block capacitance based on the above implementations, the effect of parasitic capacitance can be reduced when the conductive elements measured by the same detector are non-adjacent to one another.

Instead of activating the activators 141, 142, and 143 one after the other, they may be activated by the processor 18 simultaneously (or called total activation). In this manner, the activators 141, 142, and 143 would start activate all of the sensing points within the corresponding sensing blocks all at the same time. However, please be aware the present scenario only means the activators 141, 142, and 143 simultaneously start the step of activating the sensing points within corresponding sensing blocks, with the sensing points being activatable simultaneously or successively. Using FIG. 2 as an example, assuming the activators 141, 142, and 143 start to operate simultaneously, which means activating the corresponding sensing blocks simultaneously (i.e., all of the sensing blocks). Yet, based on the processor 18, each of the activators 141, 142, 143 may opt to either activate all of the sensing points within the corresponding sensing blocks simultaneously or successively. Put another way, the statement "activating the sensing blocks simultaneously so as to activate the sensing points within each sensing block" implies two possibilities: 1) all of the sensing points within each of the sensing blocks are activated simultaneously; and 2) all of the sensing points within each of the sensing blocks are activated successively beginning at the same time.

Next, the processor 18 may activate the detectors 146, 147, 148, and 149 simultaneously, so that all of the activated sensing points within each of the sensing blocks may be detected simultaneously or successively to obtain a corresponding block capacitance. Again, using FIG. 2 as an example, assuming the detectors 146, 147, 148, and 149 are activated simultaneously for detecting capacitances of the sensing blocks. Then, all of the sensing points within each of the sensing blocks may be detected either simultaneously or successively. Nevertheless, regardless of simultaneous or successive detection, the result is a capacitance value representing a sensing block.

Now please refer back to FIG. 3. As briefly mentioned previously, the indexed conductive elements are matched to respective detectors in a certain way to mitigate the effect of parasitic capacitance. That is, the interaction between the detectors 146, 147, 148, and 149 and the sensing blocks B31, B32, B33, and B34 (i.e., partial block diagram of a circuit for the sensing device 10) is described by the following relationship: the second conductive elements indexed 1, 5, 9, 13, 17, 21, 25, and 29 correspond to the first detector 146; the second conductive elements indexed 2, 6, 10, 14, 18, 22, 26, and 30 correspond to the second detector 147; the second conductive elements indexed 3, 7, 11, 15, 19, 23, 27, and 31 correspond to the third detector 148; and the second conductive elements indexed 4, 8, 12, 16, 20, 24, 28, and 32 correspond to the fourth detector 149. Therefore, during the detection stage, all four detectors 146, 147, 148, and 149 may operate simultaneously, and within the corresponding sensing blocks, each of the second conductive elements may be detected successively. Hence, the detection time and the effect of parasitic capacitance may be reduced.

After the capacitance of each sensing block has been obtained, the processor 18 proceeds to compare if each obtained value is greater than a first threshold value to determine whether any detected sensing block has been touched or not (to be discussed in detail later).

Figure 4:
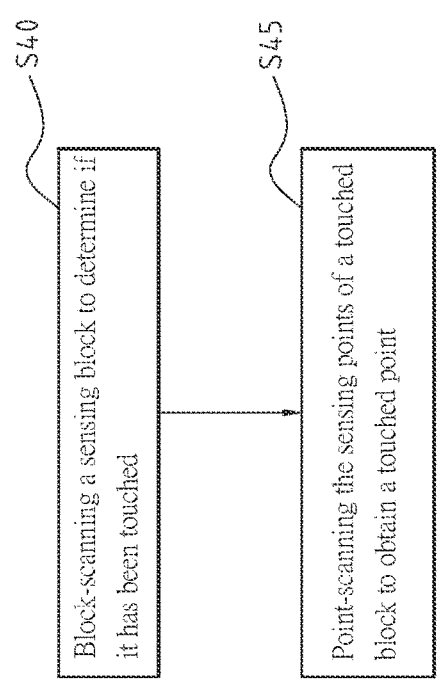
FIG. 4 is a flow chart for a first embodiment of a position detection method of the instant disclosure.

The following description is provided to discuss the position detection method and the sensing device using the same of the instant disclosure. The description is provided in conjunction with FIGS. 2 and 4, with FIG. 4 showing a flow chart of a first embodiment of the position detection method. The position detection method includes the steps of:

S40: scanning a sensing block to determine if it has been touched; and

S45: scanning the sensing points within a touched block to obtain a touched point.

As described before, the scanning operation in step S40 is implemented as follows. The processor 18 (or CPU 34) activates each of the activators 141, 142, and 143 either simultaneously or successively, so that the sensing blocks corresponding to each of the activators 141, 142, and 143 can be activated. Next, the processor 18 proceeds to activate each of the detectors 146, 147, 148, and 149 simultaneously or successively to detect the activated sensing blocks for obtaining the block capacitances. Based on FIG. 2, for a total of 12 sensing blocks, each corresponding block capacitance can be obtained after the sensing blocks have been scanned.

Then, the processor (or the CPU 34) determines if the capacitance of each sensing block is greater than the first threshold value. If it is true, the sensing block is determined to be touched. The first threshold value may be a pre-determined value selected by the manufacturer based on testing or dependent of the ambient temperature and humidity. Put another way, the first threshold value may vary according to the ambient temperature and humidity of the sensing device 10. Further yet, the first threshold value may be obtained by adding a block capacitance differential to a block background signal value. With respect to each sensing block, the block background signal value may be a pre-determined block capacitance for untouched state, and the block capacitance differential may be the block capacitance when one or more sensing points are touched. For example, the block capacitance differential may be the sum of capacitance of each sensing point within the sensing block (to be discussed in detail later). The above configuration allows greater sensitivity for touch sensing.

For step S45, the touched block is point-scanned for touched point. The point-scanning involves activating and detecting each of the sensing points successively within the touched block. As an example, for the sensing block B11, the first activator 141 first activates the left-most first conductive element 21a, followed by the first detector 146 detecting each of the second conductive elements 23a and 23b successively within the touched block. Thus, the point capacitance of each sensing point formed by the intersection of the left-most first conductive element 21a and eight second conductive elements 23a and 23b can be obtained. Then, the first activator 141 proceeds to activate the next first conductive element, namely 21b, followed by the first detector 146 detecting each of the second conductive elements 23a and 23b successively within the area. Thus, the point capacitance of each sensing point formed by the intersection of the second first conductive element 21a from the left and eight second conductive elements 23a and 23b can be obtained. Based on such manner, the point capacitances for all of the sensing points such as 240 and 241 within the sensing block B11 can be obtained.

Next, based on the obtained point capacitances, the processor (or the CPU 34) determines if any is greater than a second threshold value. If it is true, the corresponding sensing point is determined to have been touched with embedded coordination information. After one of the sensing blocks has been point-scanned, one or more touched points can be identified based on the operating condition.

The second threshold value may be pre-determined by the manufacturer as the point capacitance when at least one sensing point is touched. Another choice could be the average capacitance or the mode of the point capacitances when all of the sensing points within a sensing block are touched. Further yet, the second threshold value could even be three times (+/−) of the average capacitance. Thus, when the detected capacitance falls within the above range, the corresponding sensing point is deemed to be touched and is referred to as touched point. Nevertheless, an alternative approach is to relate the second threshold value to the ambient temperature and humidity when the sensing device 10 is in use. Still another option is to let the second threshold value be obtained by adding a point capacitance differential value to a point background signal value. The point background signal value being the point capacitance of the untouched state and is pre-selected by the manufacturer based on testing. This capacitance may also be related to ambient temperature and humidity. Afterwards, the point capacitance for touched state is obtained by testing, and the resulting difference in comparing to the untouched state gives the point capacitance differential.

If no touched block is detected after point-scanning, step S40 is repeated.

Hence, by executing steps S40 and S45, the sensing area 24 can be quickly detected for any touched point. In addition, when only one single sensing point is touched, in the case of the sensing area 24 as illustrated in FIG. 2, the conventional method requires the area to be detected 288 times (i.e., 9 sensing blocks*32 sensing points). However, for the present detection method, the number of required detection is 36 times (3*4 block capacitances+3*8 point capacitance). It is evident the number of required detection is sharply reduced, which results in higher detection efficiency. Furthermore, the detection method of the instant disclosure employs block-scanning, therefore the detection sensitivity is higher.

Figure 5:
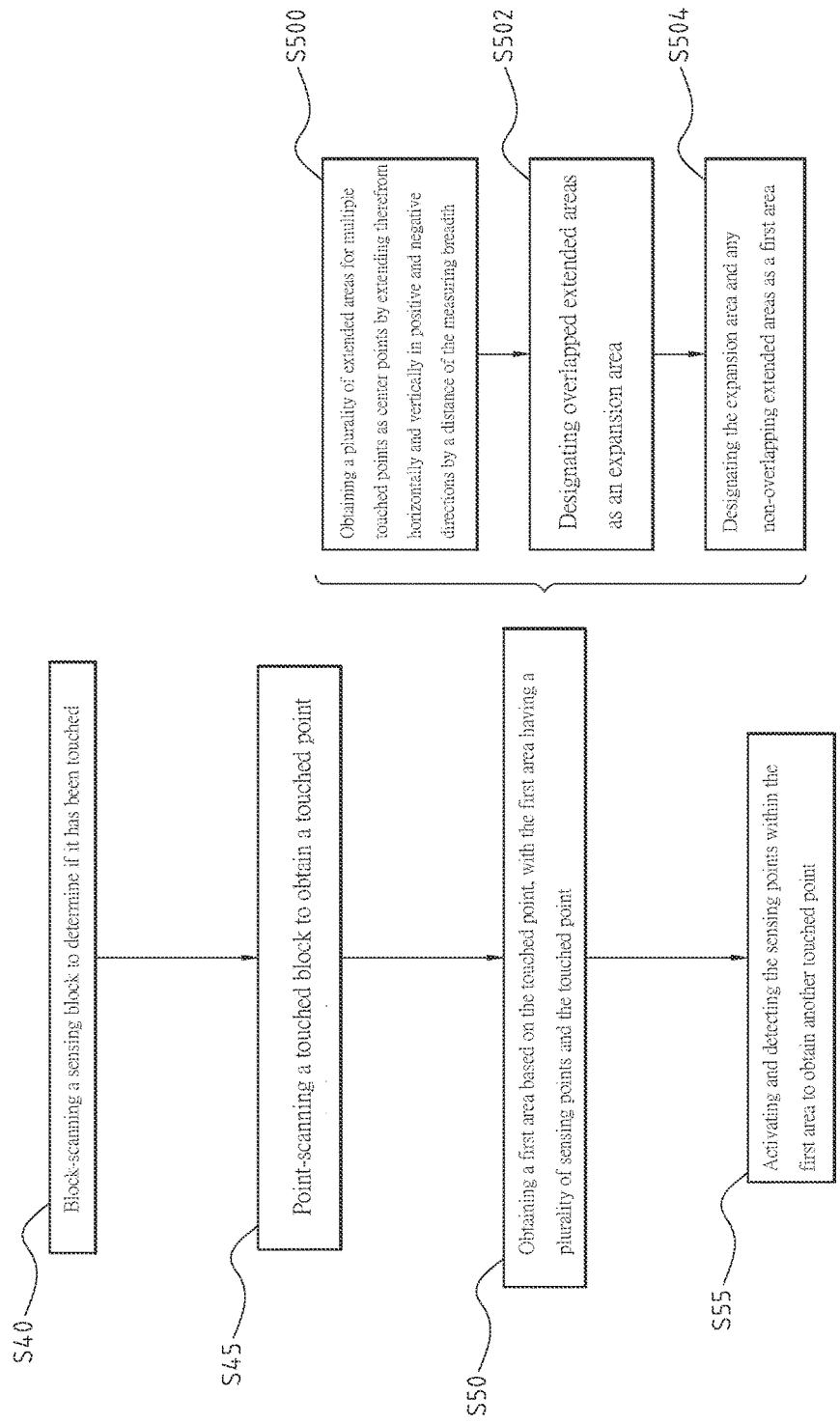
FIG. 5 is a flow chart for a second embodiment of the position detection method of the instant disclosure.

Please refer to FIG. 5, which illustrates the detection method of a second embodiment. As can be seen from the figure, the detection method comprises the steps of:

S40: block-scanning a sensing block and determining if the block has been touched;

S45: point-scanning the sensing points within the touched block to obtain a touched point;

S50: obtaining a first area based on the touched point, with the first area having a multiplicity of sensing points and the touched point; and S55: activating and detecting the sensing points within the first area to obtain another touched point.

For the ease of explanation, the touched point or points in step S45 is universally referred to as the first touched point. Based on the same concept, the other touched point or points in step S50 is referred to as the second touched point. The location of the first touched point may be the same as that of the second touched point.

Since steps S40 and S45 are similar to the ones in the first embodiment, no further elaboration will be given herein.

Figure 6:
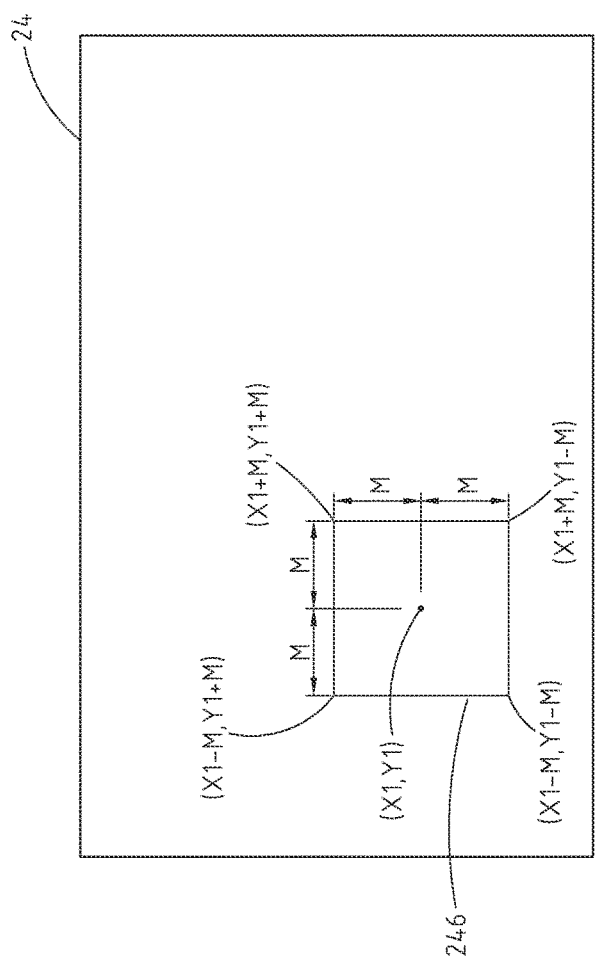
FIG. 6 is a schematic view for a first embodiment of a first area obtained in step S50 of the position detection method of the instant disclosure.

Referring to FIG. 6, which is a schematic view showing a first embodiment of obtaining the first area in step S50. The figure is based on the assumption that only one single touched point is detected in step S45 and having a coordinate pair of (X1, Y1).

In step S50, a first area 246 is obtained based on the touched point and a measuring breadth M (also referred to as "tracking breadth"). The center of the first area 246 is defined by the coordinate pair of the touched point, and the area is obtained by extending horizontally and vertically in both positive and negative directions by the measuring breadth M from the center to define an extended area. In other words, the center coordinates of the first area 246 are (X1, Y1), which is an extended area based on the measuring breadth M. The measuring breadth M is obtained by dividing a predetermined movement speed V by a sampling rate K (i.e., M=V/K). The movement speed V may be the maximum speed of a moving hand, with the movement speed V ranging from, but is not limited to, 50 to 90 cm/s. In practice, if the sensing device 10 has a relatively high surface friction, the predetermined movement speed V may be set to a smaller value. Conversely, for smaller surface friction, the predetermined movement speed V should be set to a higher value. Study reports have suggested the maximum speed of a moving hand is 76 cm/s, but is not limited thereto and will vary depending on the type of the sensing device. The unit of the measuring sampling rate K is Hertz (Hz), which indicates the number of activation/detection operations completed by the sensing device in a time period of one second (i.e., frequency). The measuring sampling rate K is related to the software, firmware, and hardware of the sensing device.

Meanwhile, the measuring breadth M can be set to different values for horizontal and vertical directions. For example, the measuring breadths M for the horizontal direction and vertical direction may be half of the width and height, respectively, of the previously mentioned sensing block. This way, the size of the first area 246 will be the same as the previously mentioned sensing block.

In the above discussion, the multi-directional extension is based on a right-angled coordinate system. That is to say the positive and negative horizontal directions refer to the positive and negative directions of the x-axis, and the positive and negative vertical directions are referring to the positive and negative directions of the y-axis. Therefore, the extended area is represented by the rectangular illustration having coordinate pairs of (X1−M, Y1−M), (X1−M, Y1+M), (X1+M, Y1+M), and (X1+M, Y1−M). For example, if (X1, Y1) corresponds to (380, 160) and the measuring breadth M is equal to 40 grid points, then the extended area is defined by a rectangle having coordinate pairs (340, 120), (340, 200), (420, 200), and (420, 120).

After the extended area has been obtained, it acts as the first area 246, with the first touched point (X1, Y1) being the center of the first area 246. The size of the first area 246 may be the same or different from the previously mentioned sensing block.

Next, for step S45, an assumption of multiple touched points (i.e., first touched points) is discussed hereinbelow. In particular, a single group comprising adjacent first touched points is referred to as first touched point group. The term "adjacent" herein may be defined as first touched points next to each other spaced by a minimum grid resolution in a grid system. An alternative definition may be the distance between adjacent first touched points being less than or equal to the measuring breadth M, or further still being less than or equal to twice the measuring breadth M. Further details regarding the above definitions are provided hereinbelow.

Figure 7A:
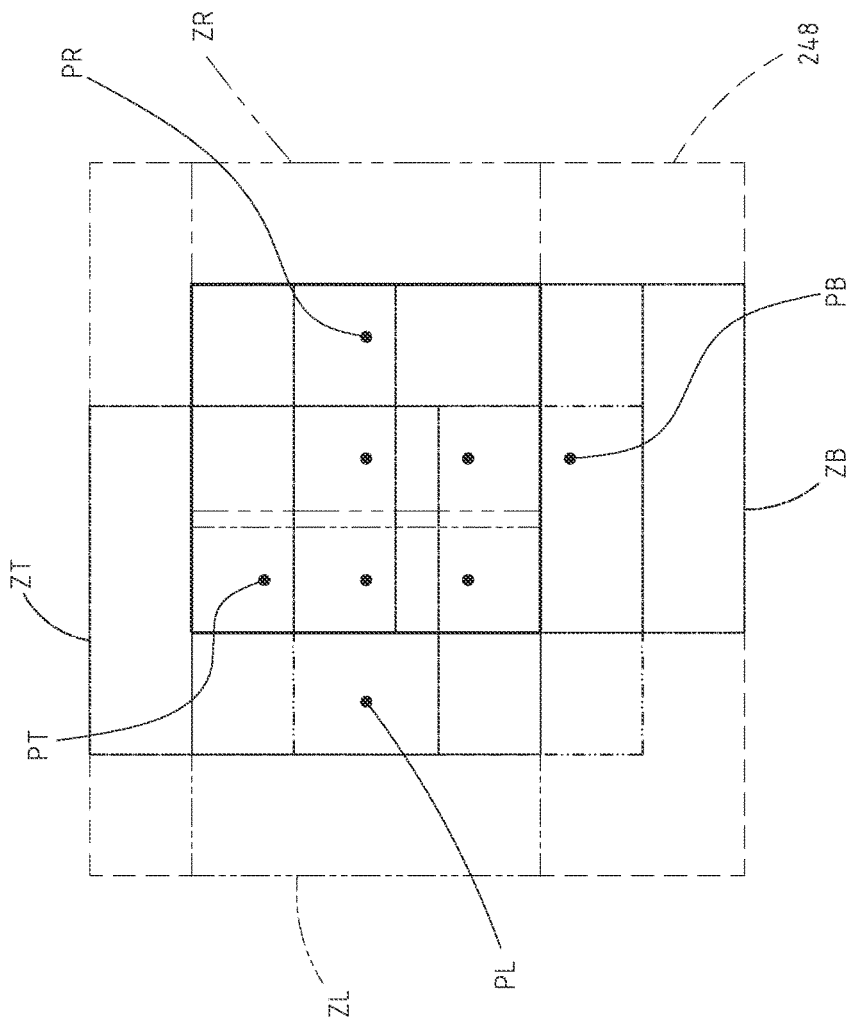
FIG. 7A is a schematic view for a first embodiment of an extended area of a first touched point group of the instant disclosure.

Please refer to FIGS. 5 and 7A. FIG. 7A shows a first embodiment of the extended area of the first touched points.

Based on FIG. 5, when multiple first touched points are obtained, the processor 18 executes the following steps:

S500: defining a plurality of extended areas based on each first touched point as center point and extending there from by a distance of measuring breadth in both positive and negative directions horizontally and vertically;

S502: designating an expansion area that includes overlapping extended areas; and S504: designating the expansion area and any non-overlapped extended area as the first area.

From FIG. 7A, it can be seen the touched coordinates include eight first touched points, with the right-most, left-most, top-most, and bottom-most points being named PR, PL, PT, and PB, respectively. These first touched points exhibit the "adjacent" relationship separated by the minimum grid resolution therebetween. After step S500 has been implemented, eight extended areas are defined with overlapping characteristic. The right-most, left-most, top-most, and bottom-most extended areas are labeled as ZR, ZL, ZT, and ZB, respectively. When executing step S504, the processor 18 designates an expansion area 248 based on the overlapped extended areas. The extent of the expansion area 248 is defined by the right border of the extended area ZR, the left border of the extended area ZL, the top border of the extended area ZT, and the bottom border of the extended area ZB.

It should be noted that for the embodiment shown in FIG. 7A, there is no non-overlapping extended area. Thus, for step S504, the abovementioned expansion area 248 is taken as the first area. That is to say the processor 18 will activate and detect the sensing points of the first area only. Hence, the sensing device 10 does not have to activate/detect the entire sensing area 24, thus the detection time can be reduced with increased efficiency.

Figure 7B:
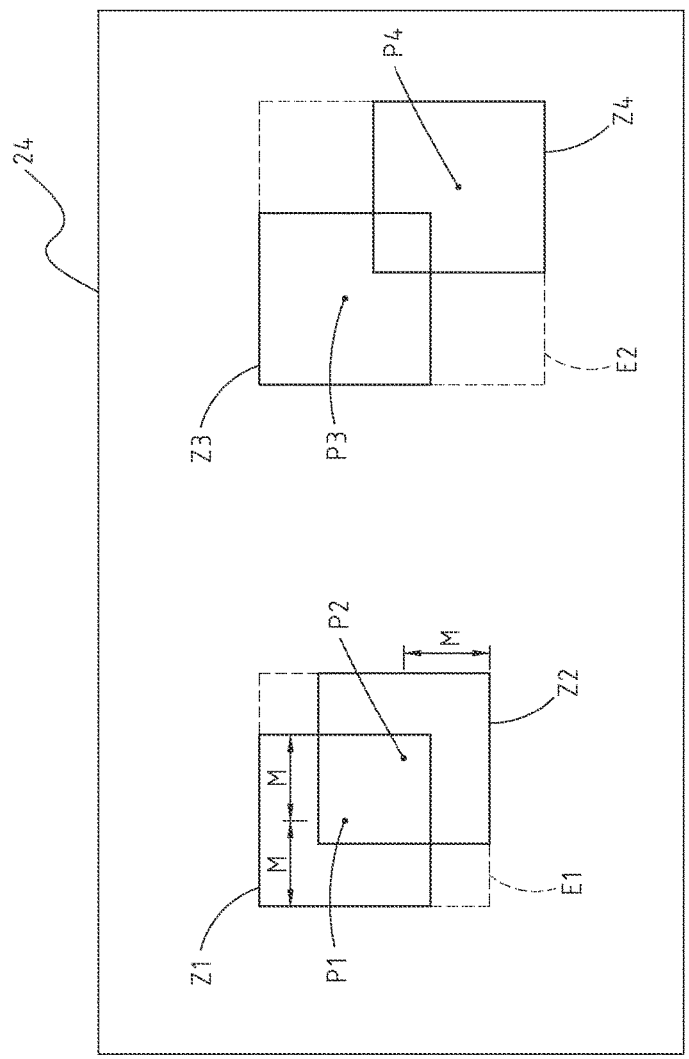
FIG. 7B is a schematic view for a second embodiment of the extended area of the first touched point group of the instant disclosure.

Next, please refer to FIG. 7B, which is a schematic view showing a second embodiment of the extended areas of the first touched points. It can be seen from the left side of the figure, two first touched points P1 and P2 are separated by a distance of less than the measuring breadth M. While on the right side of the figure, the two first touched points P3 and P4 are separated by a distance of less than two times the measuring breadth M. After the processor 18 has carried out step S500, the resulting four extended areas Z1, Z2, Z3, and Z4 are obtained, with Z1 and Z2 being overlapped, and Z3 and Z4 being overlapped. Thus, after the processor 18 has performed step S502, two expansion areas E1 and E2 are obtained. Next, the processor 18 executes step S504 to designate the expansion areas E1 and E2 as the first area 246. The processor 18 then activates/detects the first area in step S55.

It should be noted that for the two extended areas Z3 and Z4 (the distance between points P3 and P4 is greater than the measuring breadth M but less than two times thereof), in practice, may be defined as a single expansion area or otherwise depending on the actual operation without restriction.

Next, please refer to FIG. 8 in conjunction with FIG. 5. FIG. 8 is a schematic view showing a first embodiment of the expansion and extended areas of the first touched group.

Based on FIG. 8, the first touched group includes two coordinate groups G1 and G2 and a single first touched point P5. After step S502 has been implemented, two expansion areas E3 and E4 are obtained from the coordinate groups G1 and G2, while an extended area Z5 is defined from the first touched point P5. Next, when implementing step S504, the expansion areas E3 and E4 and the extended area Z5 are designated as the first area 246, which is to be activated/detected by the processor 18 to obtain another touched point (i.e., second touched point).

Figure 9:
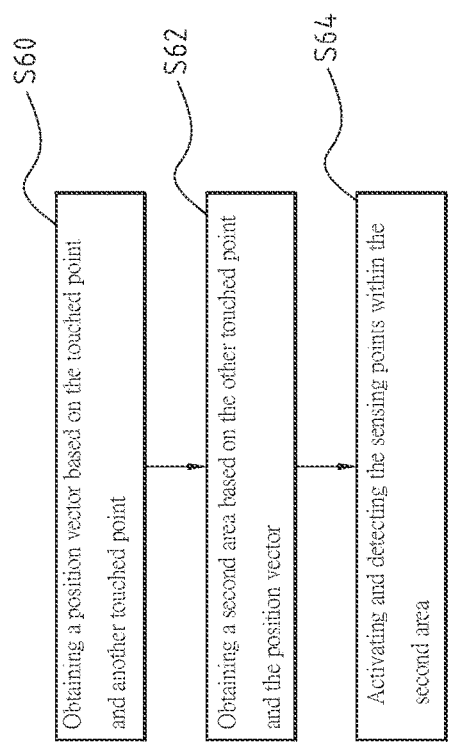
FIG. 9 is a partial flow chart for a third embodiment of the position detection method of the instant disclosure.
Figure 10:
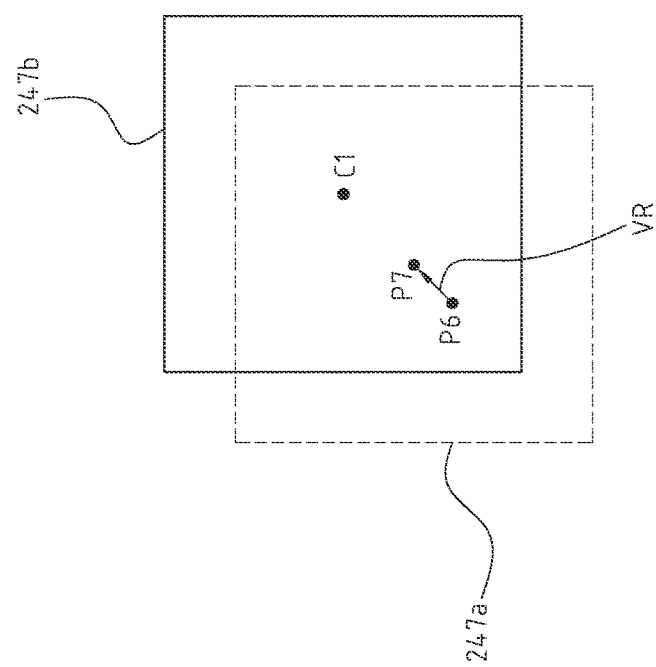
FIG. 10 shows a position vector and a second area defined for the third embodiment of the position detection method of the instant disclosure.

For another embodiment of the instant disclosure, please refer to FIGS. 5, 9, and 10. FIG. 9 illustrates a flow chart of a third embodiment of the detection method of the instant disclosure. The third embodiment is a continuation of the first embodiment shown in FIG. 5. In other words, the detection method of the third embodiment includes the steps of S40, S45, S50, and S55 of the method in FIG. 5, along with the following steps:

Step S60: obtaining a position vector based on the touched point (first touched point) and another touched point (second touched point);

Step S62: obtaining a second area based on the other touched point and position vector; and Step S64: activating/detecting the sensing points within the second area.

Based on the above, a first touched point P6 and a second touched point P7 are obtained in steps S45 and S55, respectively. Thus, in step S60, the first touched point P6 is selected as the starting point of a vector VR, with the second touched point P7 being the end point. Hence, the position vector VR can be obtained, which includes a direction (angle) and a scalar (length). The angle represents the direction in which the user continuously touching the sensing area 24, while the scalar indicates the distance that the user has touched and moved continuously between the previous (step S45) and current (step S55) detections. If the first and second touched points P6 and P7 happen to have the same coordinates, no vector will be obtained, and the processor 18 will implement steps S50 and S55 in FIG. 5. The following description is based on the condition when the first and second touched points P6 and P7 have different coordinates.

In step S62, a second area 247b is obtained based on the other touched point P7 (second touched point) and the position vector VR. The second area includes a multiplicity of sensing points such as 240 and 241. The second touched point P7 deviates from the center point of the second area 247b in a direction opposite of the position vector VR. The deviation is directly proportional to the magnitude of the position vector VR.

Please refer to FIG. 10, which is a schematic view showing the position vector and the second area of the detection method for the third embodiment of the instant disclosure. As can be seen, the position vector VR is directed toward the upper right-hand corner at an angle of approximately 45 degrees. In other words, based on the first touched point P6, the user touches continuously toward the upper right-hand corner at an angle of approximately 45 degrees. Based on the second embodiment of the instant disclosure, the extended area obtained is defined by extending from the second touched point P7 as the center point, in order to form the extended area 247a. However, for the present embodiment, the direction of continuous touching by the user is taken into consideration. As can be seen from FIG. 10, the second area 247b has a center location C1. The second touched point P7 deviates from the center location C1 in a direction toward the lower left-hand corner by an angle of approximately 45 degrees. In other words, within the second area 247b obtain in step S62, the second touched point P7 deviates from the center point of the second area 247b in a direction opposite of the position vector VR. The extent of deviation is directly proportional to the magnitude (i.e., scalar) of the position vector.

The deviation and position vector VR may be related to the previously mentioned measuring breadth M. In other words, the measuring breadth M corresponds to a built-in movement speed and a predetermined distance (amount of movement). When the scalar of the position vector VR matches the built-in movement speed, that means the deviation is equivalent to the predetermined distance. If the scalar is greater, the resulting deviation would be greater than the predetermined distance. On the other hand, the deviation may be determined by multiplying the position vector VR to the predetermined distance and divided by the built-in movement speed. Likewise, if the scalar is smaller, the resulting deviation would be less than the predetermined distance.

Referring to FIG. 11, which illustrates another embodiment for step S62. If the first touched point P6 is replaced by the second touched point P7 in step S55, the extended area 247a can be obtained. However, for another embodiment of obtaining the second area, another second area 247c is defined with a multiplicity of sensing points and is sized in proportion to the magnitude of the position vector VR. In other words, the extent of the second area 247c is related to the measuring breadth M and the built-in movement speed. When the scalar of the position vector VR matches the built-in movement speed, the second area 247c is defined as a rectangular region with each of the lengths and widths being twice of the measuring breadth M. If the scalar does not match the built-in movement speed, the lengths and widths (being 2× of the measuring breadth M) of the second area 247c is multiplied by a scaling factor. The scaling factor may be calculated as the scalar of the position vector VR divided by the built-in movement speed. The second area 247c shown in FIG. 11 is based on the scalar of the position vector VR being greater than the built-in movement speed.

For another second area 247d shown in FIG. 11, not only is the scaling factor of the extended area being considered, but the direction of the position vector VR is also taken into consideration. From this figure, it can be seen that the second area 247d deviated from the second touched position by a certain distance directed toward the upper right-hand corner. Description of the magnitude of deviation has already been provided hereinbefore.

Next, based on step S64 shown in FIG. 9, the sensing points disposed within the second areas 247b, 247c and 247d are activated/detected to obtain another touched point (referred to as a third touched point). Thereby, the processor 18 can monitor the continuous touch motion of the user in a more precise manner, and the activation/detection steps can be carried out more quickly. After step S64 has been completed, the next step to follow could be step S50 or S60. When the next touched point has the same location as the previous touched point, step S50 may be used to obtain the next area (first area) for activation/detection. Alternatively, touched points having the same locations may be discarded, and the second area obtained by step S62 may be used again for activation/detection.

For the previously mentioned steps S60, S62, and S64, it should be noted that the description is based on a single touched point, but is not restricted thereto. If multiple second touched points P7 are obtained by the processor 18, steps S60, S62, and S64 may adopt the approach used by steps S50 and S55 to determine the second area. In addition, the center location of this second area does not have to be the absolute center position. Instead, an approximate center is allowable.

While the instant disclosure has been described by way of example and in terms of the preferred embodiments, it is to be understood that the invention needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A method for position detection adapted to a sensing device having a plurality of sensing blocks arranged in a 2-D array, with each sensing block having a plurality of sensing points arranged in a 2-D array, comprising:
    conducting a block-scan to determine whether a touched block exists;
    conducting a point-scan within the touched block to obtain a first touched point;
    obtaining a first area surrounding the first touched point and at least one other sensing point of the plurality of sensing points, the first area being defined based on a preset distance away from the touched point independent of a boundary of the touched block including the first touched point; activating and detecting the sensing points within the first area to obtain a second touched point which occurs after the first touched point;
    obtaining a position vector based on the first touched point and the second touched point;
    obtaining a second area based on the second touched point and the position vector, wherein the second area includes a plurality of sensing points, with a length of the second area and a width of the second area being directly proportional to the magnitude of the position vector, and wherein the second touched point being located at the center of the second area; and
    activating and detecting the sensing points within the second area.

2. The method of claim 1, wherein conducting the block-scan to determine whether the touched block exists comprises:
    activating and detecting each of the sensing blocks in sequence such that all of the sensing points within the scanned sensing block are activated simultaneously and then detected simultaneously to obtain a block capacitance; and
    designating the sensing block as a touched block when the corresponding block capacitance is greater than a first threshold value.

3. The method of claim 1, wherein conducting the block-scan to determine whether the touched block exists comprises:
    activating all of the sensing blocks simultaneously to activate all of the sensing points within each sensing block;
    detecting all of the sensing points within the activated sensing blocks simultaneously to obtain a block capacitance; and
    designating the sensing block as a touched block when the corresponding block capacitance is greater than a first threshold value.

4. The method of claim 3, wherein if any touched sensing block is identified, the touched sensing block is point-scanned to obtain a touched point by:
    activating and detecting each of the sensing points in sequence within the touched sensing block to obtain a corresponding point capacitance; and
    designating that the sensing point as the first touched point when the corresponding point capacitance is greater than a second threshold value.

5. The method of claim 1, wherein the first touched point is located at the center of the first area.

6. The method of claim 1, wherein a plurality of first touched points is obtained upon identifying the touched sensing block and the first area is defined by:
    defining a plurality of extended areas by extending horizontally and vertically in the positive and negative directions from each first touched point as a center point by the preset distance;
    designating the overlapped extended areas as an expansion area; and
    designating the expansion area and any non-overlapping extended area as the first area.

7. The method of claim 6, wherein the preset distance is calculated by dividing a predetermined movement speed by a measurement sampling rate, and the preset distance is less than a maximum distance between at least one of the touched points and an outermost extent of the sensing device.

8. The method of claim 1, wherein conducting one or more of the block-scan or the point-scan comprises:
    activating the plurality of sensing points included in at least one sensing block; and
    detecting a capacitance of the activated sensing points by way of two separate capacitance detectors,
    wherein
        a first capacitance detector of the two separate capacitance detectors is communicatively coupled with a first half of the activated sensing points, a second capacitance detector of the two separate capacitance detectors is communicatively coupled with a second half of the activated sensing points, and the first capacitance detector and the second capacitance detector are each communicatively coupled with the activated sensing points included in each corresponding half of the activated sensing points by alternating conductive lines.

9. A sensing device, comprising:

a first sensing layer and a second sensing layer arranged in a stacked manner to define a sensing area, which including a plurality of sensing blocks arranged in a 2-D array, with each sensing block having a plurality of sensing points arranged in a 2-D array; and a controller for:

scanning a sensing block to determine if the sensing block has been touched or not;

obtaining a first touched point by scanning the sensing points within a touched sensing block;

obtaining a first area surrounding the first touched point and at least one other sensing point of the plurality of sensing points, the first area being defined based on a preset distance away from the first touched point independent of a boundary of the touched sensing block including the first touched point;

activating and detecting the sensing points within the first area to obtain a second touched point which occurs after the first touched point;

obtaining a position vector based on the first touched point and the second touched point;

obtaining a second area based on the second touched point and the position vector, wherein the second area includes a plurality of sensing points, with a length of the second area and a width of the second area being directly proportional to the magnitude of the position vector, and wherein the second touched point being located at the center of the second area; and activating and detecting the sensing points within the second area.

10. The sensing device of claim 9, wherein the controller comprises:

a plurality of activators with each activator corresponding to at least one sensing block for activating the sensing points therewithin;

a plurality of detectors with each detector corresponding to at least one sensing block for detecting the capacitance of each activated sensing point within the sensing block; and a processor for activating the activators and detectors for block-scanning, wherein the processor:

activates and detects each of the sensing blocks in sequence so that the sensing points are activated simultaneously and then detected simultaneously to obtain a block capacitance; and designates the sensing block as a touched block if the corresponding block capacitance is greater than a first threshold value.

11. The sensing device of claim 9, wherein the controller comprises:

a plurality of activators with each activator corresponding to at least one sensing block for activating the sensing points therewithin;

a plurality of detectors with each detector corresponding to at least one sensing block for detecting the capacitance of each activated sensing point within the sensing block; and a processor for activating the activators and detectors for block-scanning, wherein the processor:

activates the activators simultaneously to activate the sensing points within each of the sensing blocks;

activates the detectors simultaneously to detect the sensing points simultaneously within activated sensing blocks to obtain corresponding block capacitances; and designates the sensing block as a touched block if the corresponding block capacitance is greater than a first threshold value.

12. The sensing device of claim 11, wherein when the touched block has been identified, the touched block is point-scanned to obtain the first touched point, and wherein the point-scanning includes:

activating and detecting each of the sensing points in sequence within the touched block to obtain a corresponding point capacitance; and designating the sensing point as the first touched point if the corresponding point capacitance is greater than a second threshold value.

13. The sensing device of claim 11, wherein the activator and detector both corresponding to the same sensing block are grouped within a single integrated circuit.

14. The sensing device of claim 11, wherein the sensing points within each of the sensing blocks are not adjacent to one another along the detection direction.

15. An apparatus, comprising:

a sensing area comprising a plurality of sensing blocks, each sensing block of the plurality of sensing blocks comprising a plurality of sensing points;

a plurality of activators, each activator of the plurality of activators being communicatively coupled with at least one sensing block of the plurality of sensing blocks, and configured to activate one or more sensing points included in the at least one sensing block with which a corresponding activator is communicatively coupled;

a first detector communicatively coupled with at least a first sensing block and a second sensing block of the plurality of sensing blocks, the first detector being configured to detect the capacitance of one or more active sensing points included in at least the first sensing block and one or more active sensing points included in the second sensing block;

a second detector communicatively coupled with at least the first sensing block and at least the second sensing block, the second detector being configured to detect the capacitance of one or more active sensing points included in at least the first sensing block and one or more active sensing points included in the second sensing block, wherein the first detector and the second detector are configured to detect the capacitance of different sensing points included in the first sensing block and different sensing points included in the second sensing block; and a processor communicatively coupled with the activators of the plurality of activators, the first detector and the second detector, the processor being configured to:

cause the activators of the plurality of activators to activate the plurality of sensing points included in the sensing blocks of the plurality of sensing blocks;

identify at least one sensing block of the plurality of sensing blocks as a touched sensing block based on a determination that the at least one sensing block includes at least one active sensing point with a capacitance that is greater than a first threshold value;

identify at least one active sensing point included in the touched sensing block as a touched point based on a determination that the at least one active sensing point has a capacitance greater than a second threshold value;

define a first region of the sensing area surrounding the touched point and at least one other sensing point of the plurality of sensing points, the first region being defined based on a preset distance away from the touched point independent of a boundary of the touched sensing block including the touched point; and cause one or more activators of the plurality of activators to activate the sensing point identified as the touched point and the at least one other sensing point included in the first region to identify at least one second touched point.

16. The apparatus of claim 15, further comprising:

a plurality of first lines communicatively coupling the first detector with a first group of sensing points included in the first sensing block and the second sensing block; and a plurality of second lines communicatively coupling the second detector with a second group of sensing points included in the first sensing block and the second sensing block, wherein the first lines of the plurality of first lines and the second lines of the plurality of second lines are alternately arranged.

* * * * *